Figure 1:
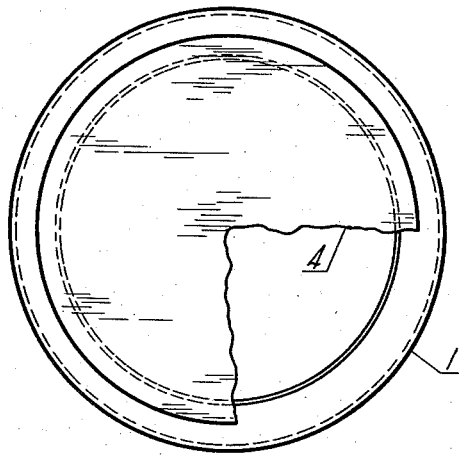

Aug. 12, 1941.   L. POGLEIN   2,252,292
MOLD RING AND PLUNGER
Filed March 10, 1939

INVENTOR.
Louis Poglein
BY William B. Jaspert
ATTORNEY.

Patented Aug. 12, 1941

2,252,292

UNITED STATES PATENT OFFICE 2,252,292

MOLD RING AND PLUNGER

Louis Poglein, Jeannette, Pa., assignor to McKee Glass Company, Jeannette, Pa., a corporation of Pennsylvania Application March 10, 1939, Serial No. 260,980

1 Claim. (Cl. 49—72)

This invention relates to new and useful improvements in metal molds for making glass articles from molten glass, and more particularly to an improved ring and plunger for glass making molds.

It is a primary object of the invention to provide a ring and plunger design which shall eliminate wear resulting from friction, and frequent replacement of the ring and plunger parts.

Figure 2:
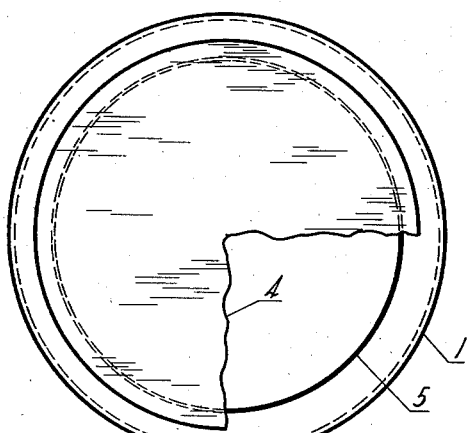
Figure 3:
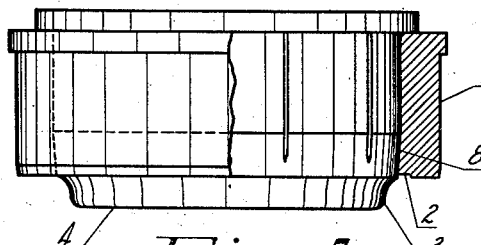
Figure 4:
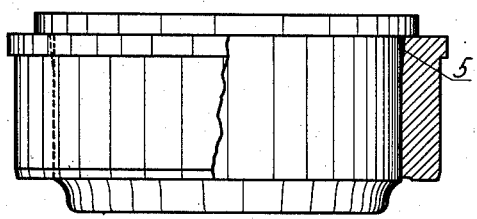
Figure 5:
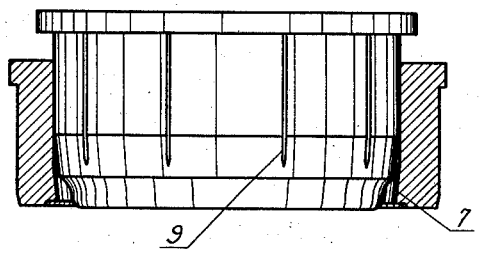
Figure 6:
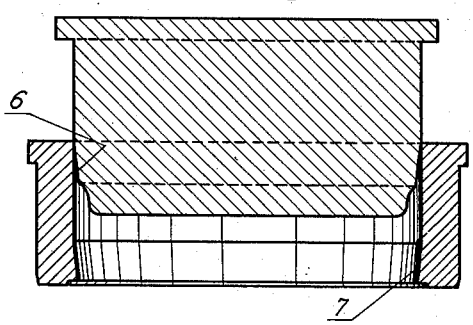

The invention will become more apparent from a consideration of the accompanying drawing constituting a part hereof in which like reference characters designate like parts and in which:

Fig. 1 is a top plan view of an improved form of mold ring and plunger with the plunger partially cut away, embodying the principles of this invention;

Fig. 2 a similar view of a conventional form of plunger;

Fig. 3 a side elevational view of a ring and plunger with the ring portion partially cut away and shown in vertical cross-section;

Fig. 4 a similar view of a modified form of plunger;

Fig. 5 a side elevational view of a plunger and vertical cross-sectional view of mold ring; and Fig. 6 a vertical cross-sectional view of a mold ring and plunger.

In the drawing, the numeral 1 designates the mold ring having a matrix portion 2 which coacts with a matrix portion 3 of a plunger 4 which forms the lip or mouth of a hollow glass article, such as a tumbler, bowl or similar item. Such mold ring and plunger are used in large quantities in glass fabricating plants, and because of the sliding movement of the plunger in the ring in an axial direction, the rings and plungers are rapidly worn away at the working portions thereof, as illustrated in Fig. 4 at the portion designated by the reference numeral 5.

To eliminate the wear on the ring, the present invention contemplates the use of a plunger, as shown in Figs. 3 to 6 inclusive, having its bottom portion tapered as shown at 6, the straight portion acting as a pilot for alignment of the plunger with the ring as it enters the ring in its downward travel. Also, the ring portion is tapered, as shown at 7, Figs. 5 and 6, to provide a sealed joint 8, Fig. 3, when the ring and plunger are in cooperative relation while acting upon the glass article to be formed. The plunger is also provided with a series of angularly spaced axially extending grooves 9 which act as air vents to avoid suction during the movement of the plunger in the ring.

By means of the tapered end of the plunger, and the complementary-shaped bottom portion of the ring, the rapid wearing of the ring and plunger is eliminated and no wear is experienced on the main part of the plunger, which is the part which meets with the lowered edge of the mold ring during the molding operation. Also, the tapered plunger centers the plunger with the ring, and such surfaces as are subjected to wear are at a portion of the ring and plunger which are of no consequence to the working or molding portion and surfaces of the mold ring and plunger parts.

I am aware that tapered plungers have heretofore been employed, the taper extending along the full length of the plunger, thereby preventing contact or seating of the plunger and ring until the plunger has reached its extreme lowered position. Such practice does not, however, result in a smooth operation productive of a molded glass article of uniform dimensions and quality.

I claim:

A mold for forming glassware comprising a mold ring and plunger having coacting cylindrical walls of substantial length constituting guiding and wearing surfaces and having their lower ends tapered radially inward to prevent contact during travel of the plunger and to form a seal only at the lower extremity of the plunger travel, said ring and plunger constituting a continuous matrix surface at their lower ends when in their sealed position.

LOUIS POGLEIN.